United States Patent
Kuriyama et al.

(10) Patent No.: US 7,589,955 B2
(45) Date of Patent: Sep. 15, 2009

(54) ELECTRIC DOUBLE LAYER CAPACITOR AND AGGREGATION THEREOF

(75) Inventors: Chojiro Kuriyama, Kyoto (JP); Hiroyuki Yanagisawa, Shiga (JP)

(73) Assignee: Rohm Co., Ltd., Kyoto (JP)

( * ) Notice: Subject to any disclaimer, the term of this patent is extended or adjusted under 35 U.S.C. 154(b) by 317 days.

(21) Appl. No.: 11/559,715

(22) Filed: Nov. 14, 2006

(65) Prior Publication Data

US 2007/0109723 A1    May 17, 2007

(30) Foreign Application Priority Data

Nov. 16, 2005   (JP) ............... 2005-331668

(51) Int. Cl.
    *H01G 9/00*    (2006.01)
(52) U.S. Cl. ...................... 361/502; 361/503
(58) Field of Classification Search ............... 361/502, 361/503
    See application file for complete search history.

(56) References Cited

U.S. PATENT DOCUMENTS

| | | | | |
|---|---|---|---|---|
| 5,783,928 A | * | 7/1998 | Okamura | 320/122 |
| 6,631,072 B1 | * | 10/2003 | Paul et al. | 361/502 |
| 6,740,447 B1 | * | 5/2004 | Keshishian | 429/178 |
| 2004/0264108 A1 | * | 12/2004 | Yamazaki et al. | 361/502 |
| 2006/0166092 A1 | * | 7/2006 | Takahashi et al. | 429/209 |

FOREIGN PATENT DOCUMENTS

| | | |
|---|---|---|
| JP | 2003-092234 A | 3/2003 |
| JP | 2005317764 A * | 11/2005 |

* cited by examiner

*Primary Examiner*—Eric Thomas
(74) *Attorney, Agent, or Firm*—Keating & Bennett, LLP

(57) ABSTRACT

An electric double layer capacitor includes an anode, a cathode, and an electrolytic solution provided between the anode and the cathode. The anode may be a niobium porous sintered body with an oxide film formed as a dielectric layer on a surface thereof. The cathode allows an electric double layer at an interface with the electrolytic solution. The electric double layer capacitor has a large capacitance and increased voltage.

22 Claims, 8 Drawing Sheets

ELECTRIC DOUBLE LAYER CAPACITOR AND AGGREGATION THEREOF

BACKGROUND OF THE INVENTION

1. Field of the Invention

The present invention relates to an electric double layer capacitor and aggregation thereof.

2. Description of the Related Art

Capacitors are utilized in backup power supplies and auxiliary power supplies for portable electronic equipment including cell phones, rechargeable devices with solar batteries, and even motor power supplies or regenerative energy devices for so-called hybrid cars. In particular, electric double layer capacitors are suited for use in applications where large capacities are required.

FIG. 15 shows one example of a conventional electric double layer capacitor. This electric double layer capacitor X includes an anode 91 and a cathode 92 having distribution electrodes 91a, 92a made from activated carbon, respectively. A partition wall 93 and an electrolytic solution 94 are arranged between the distribution electrodes 91a, 92a. In the electric double layer capacitor X, so-called electric double layers are generated at interfaces between the electrolytic solution 94 and the distribution electrodes 91a, 92a, on which positive and negative ions are distributed across the interfaces. The electric double layer is used for electric storage. Due to its relatively large electrostatic capacity, the electric double layer capacitor X is suitable for use in the above-mentioned power supply and storage applications.

Recently, however, development of new capacitor applications has started in which capacitors with a relatively large capacity of about 100 μF to 10 F are installed into card-type devices, for example. Although high in capacitance, the electric double layer capacitor X has a structure sealed entirely by a metal cylinder can and does not represent a remarkable improvement in decreased size. Meanwhile, solid electrolytic capacitors are often used in applications requiring miniaturization. These solid electrolytic capacitors, however, do not lend themselves to an increased capacity. Accordingly, there are needs for capacitors that are compact, thin, and suitable for uses in which relatively large capacitances are required.

Another related electric double layer capacitor is disclosed in Japanese Unexamined Patent Publication No. 2003-92234 (see FIG. 1).

SUMMARY OF THE INVENTION

In order to overcome the problems described above, preferred embodiments of the present invention provide an electrolytic capacitor that can be made smaller and thinner and has a relatively large capacitance.

An electric double layer capacitor according to a first preferred embodiment of the present invention includes a pair of electrodes each including a carbon layer and disposed opposite to each other, a partition wall separating the pair of electrodes from each other, and an electrolytic solution intervening between the pair of electrodes, wherein the carbon layer has a thickness of about 6 μm or less.

According to such a configuration, a current path becomes shorter between the electrodes and the electrolytic solution. The shorter the current path is, the smaller the electric double layer capacitor's ESR can be made, thereby reducing electric loss. Lowered ESR is convenient for quick discharge of electric energy stored in the electric double layer capacitor. Further, the thinner the carbon layer becomes, the more advantageously the electric double layer can be reduced in thickness.

According to another preferred embodiment of the present invention, the electric double layer capacitor has a thickness of about 1,000 μm or less in the direction in which the pair of electrodes and the partition wall are layered. According to such a configuration, the electric double layer capacitor can be installed into thin electronic equipment such as a card-type device, for example.

An electric double layer capacitor according to a second preferred embodiment of the present invention includes a pair of electrodes each including a carbon layer and disposed opposite to each other, a partition wall separating the pair of electrodes from each other, and an electrolytic solution intervening between the pair of electrodes, wherein the thickness in the direction in which the pair of electrodes and the partition wall are layered is about 1/50 or less of its width in the direction perpendicular to the direction of the layering.

According to such a configuration, this preferred embodiment is suitable for installation into card-type devices or the like. It can also enhance the electric double layer capacitor's flexibility.

An electric double layer capacitor according to a third preferred embodiment of the present invention includes a pair of electrodes each including a carbon layer and placed opposite to each other, a partition wall separating the pair of electrodes from each other, and an electrolytic solution intervening between the pair of electrodes, wherein the electric double layer capacitor can be bent due to its flexibility.

According to such a configuration, this preferred embodiment can be installed into electric equipment having a flexible structure. More specifically, if a user uses the above-mentioned electric equipment in such a manner that it is bent or folded, the electric double layer capacitor can appropriately follow the bends or folds.

In a preferred embodiment of the present invention, the withstand voltage of the electric double layer capacitor is about 1.2V or more.

In another preferred embodiment of the present invention, the operating temperature limit of the electric double layer capacitor is about 100° C. or more.

In another preferred embodiment of the present invention, the preferred embodiment described above further includes a pair of external electrodes each conductive to the above-mentioned pair of electrodes, and has a high-resistance portion which is arranged between at least one of the pair of electrodes and the external electrodes conductive thereto and is smaller in cross-sectional area than the one electrode and the external electrodes. According to such a configuration, this accomplishes a so-called fuse capability with which, when an excessive current passes through the high-resistance part, the high-resistance portion melts and thus cuts off the current due to Joule heating. Consequently, the high-resistance portion is suitable for protecting the electric double layer capacitor and electric equipment in which the same is installed.

In another preferred embodiment of the present invention, the high-resistance portion includes wires.

An aggregation of electric double layer capacitors according to a fourth preferred embodiment of the present invention includes a plurality of electric double layer capacitors provided by any one of the first to third preferred embodiments of the present invention.

In another preferred embodiment of the present invention, the plurality of electric double layer capacitors are connected to one another in series.

In another preferred embodiment of the present invention, the plurality of electric double layer capacitors are connected to one another in parallel.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described specifically with reference to the drawings as below.

Figure 1:
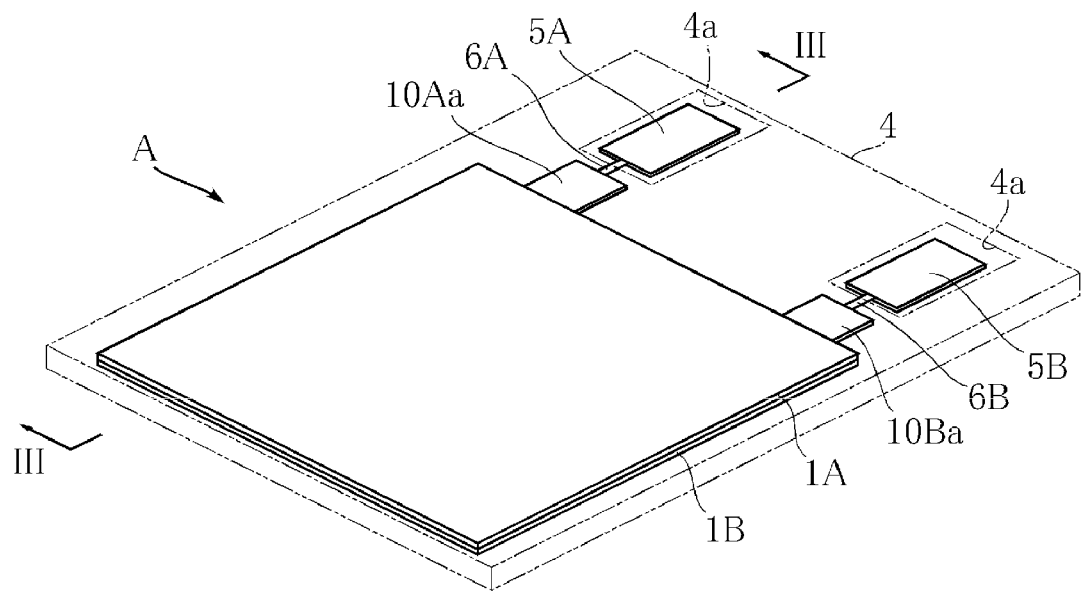
FIG. 1 is an overall perspective view showing one example of an electric double layer capacitor according to a preferred embodiment of the present invention.
Figure 2:
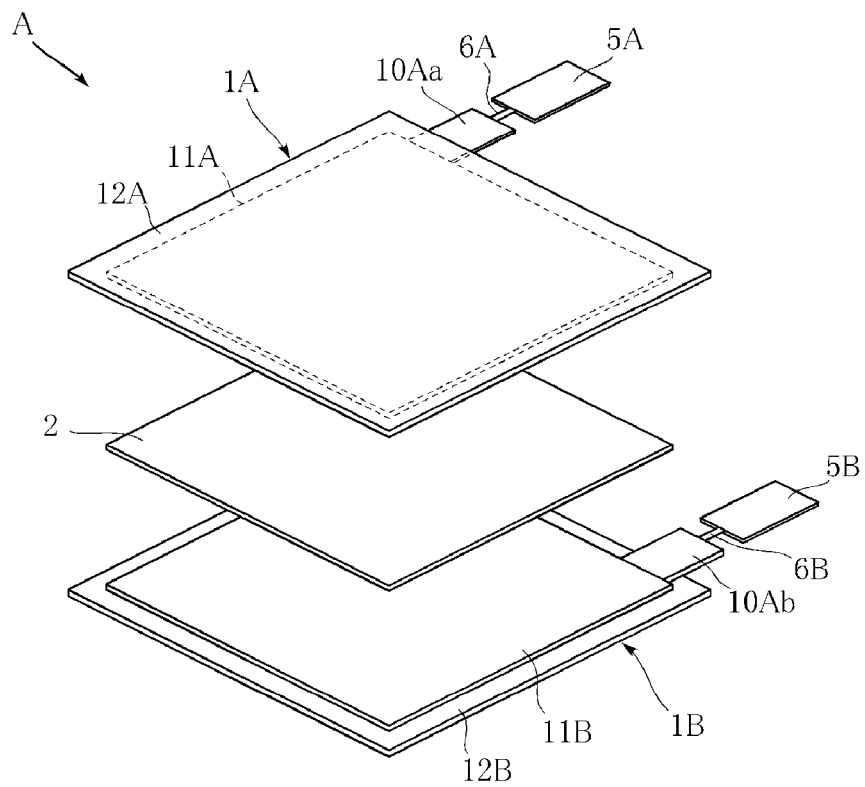
FIG. 2 is an exploded perspective view of main components showing one example of an electric double layer capacitor according to a preferred embodiment of the present invention.
Figure 3:
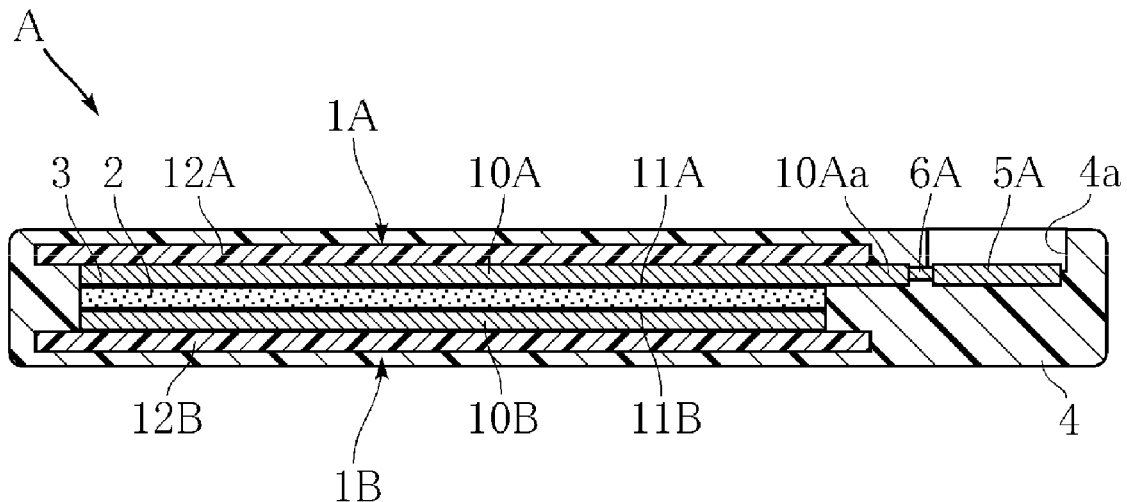
FIG. 3 is a cross-sectional view of FIG. 1 taken along the line III-III.
Figure 4:
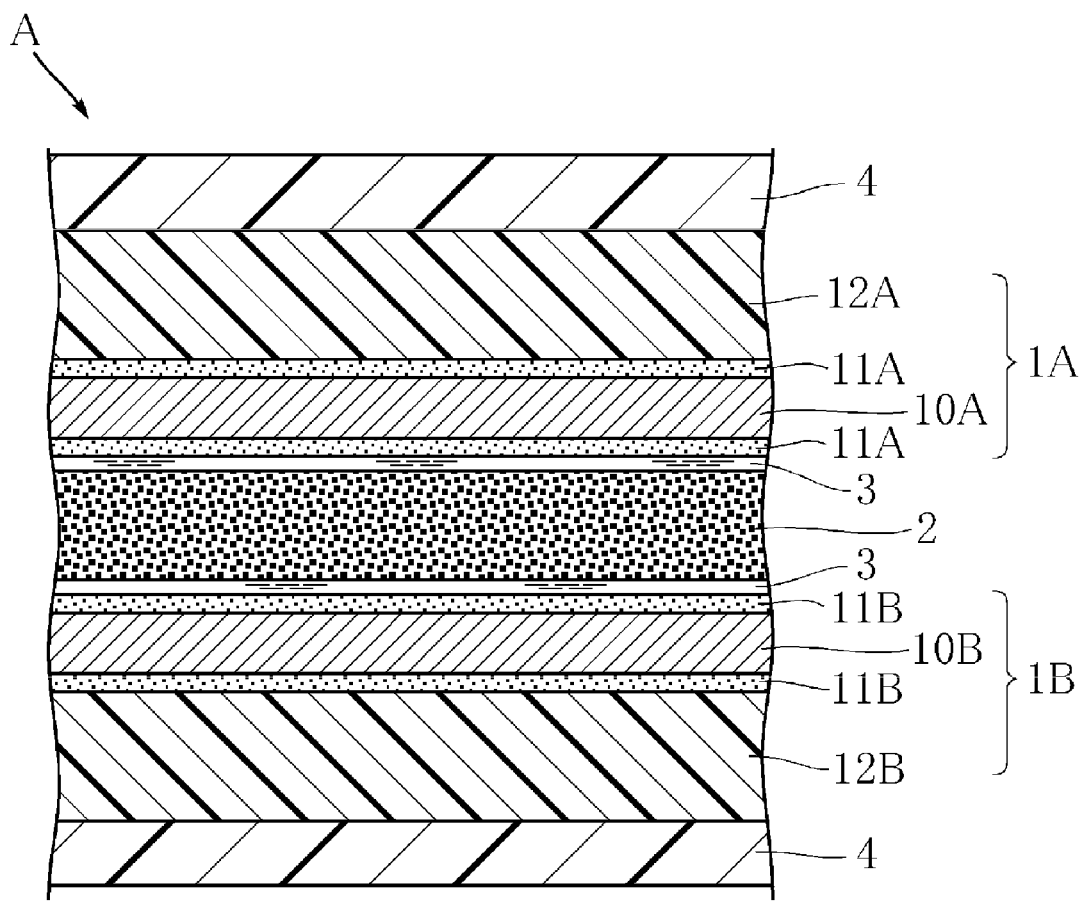
FIG. 4 is an enlarged cross-sectional view of main components showing one example of an electric double layer capacitor according to a preferred embodiment of the present invention.
Figure 5:
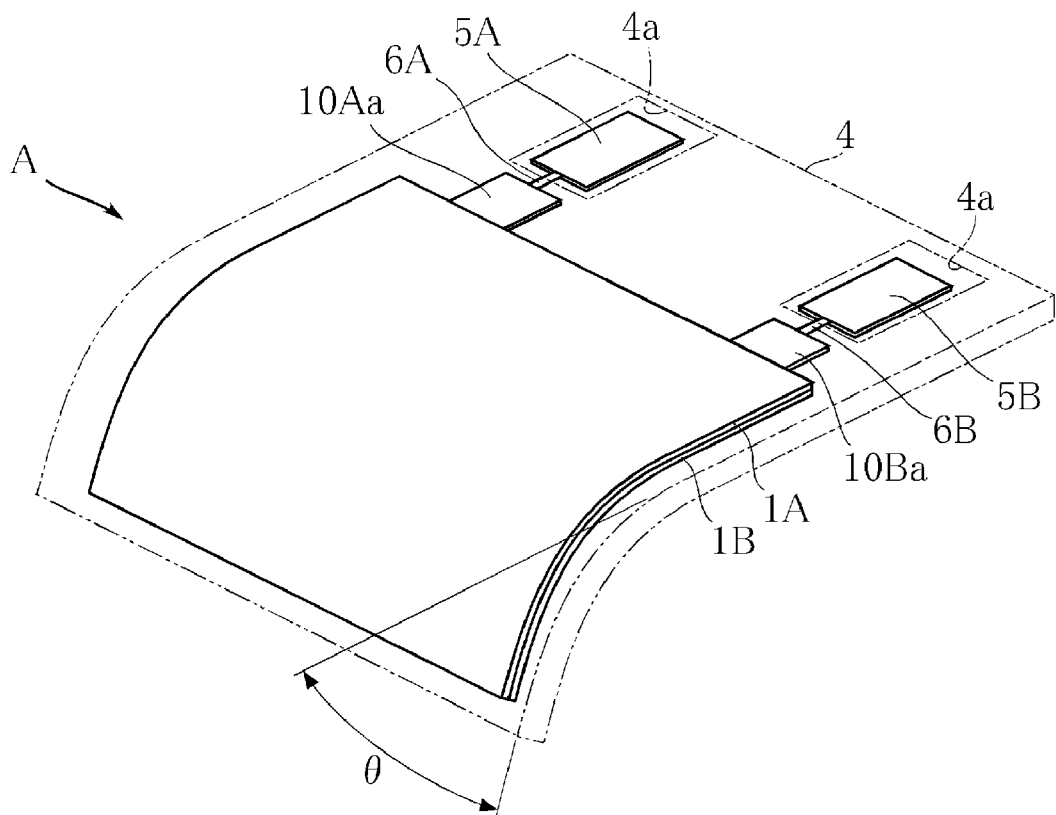
FIG. 5 is an overall perspective view showing a bending state of one example of an electric double layer capacitor according to a preferred embodiment of the present invention.

FIG. 1 to FIG. 5 show one example of an electric double layer capacitor according to a preferred embodiment of the present invention. The electric double layer capacitor A includes a pair of electrodes 1A, 1B, a partition wall 2, an electrolytic solution 3, a resin package 4, a pair of external connecting terminals 5A, 5B, and high-resistance portions 6A, 6B. FIG. 2 is an exploded perspective view of the electric double layer capacitor A with the electrolytic solution 3 and the resin package 4 omitted. FIG. 4 is a partial enlarged view of FIG. 3. FIG. 5 illustrates the electric double layer capacitor A in a bending state.

The pair of electrodes 1A, 1B are arranged separated from and opposite to each other, as shown in FIG. 3. In using the electric double layer capacitor A, either one of the pair of electrodes 1A, 1B may be an anode and the other the cathode. As shown in FIG. 2 and FIG. 4, the pair of electrodes 1A, 1B are configured to include collector electrodes 10A, 10B, distribution electrodes 11A, 11B, and protective sheets 12A, 12B, respectively.

The collector electrodes 10A, 10B are defined by approximately square main bodies and extending portions 10Aa, 10Ba extending from the main bodies. The collector electrodes 10A, 10B are preferably aluminum plates, for example, and are preferably about 12 µm to about 50 µm in thickness, and are about 20 µm thick in this preferred embodiment. The main bodies are on the order of about 5 mm per side. The external connecting terminals 5A, 5B are coupled to the extending portions 10Aa, 10Ba through the high-resistance portions 6A, 6B.

The distribution electrodes 11A, 11B are preferably formed by kneading fine particles of activated carbon with a binder, for example, and cover the main bodies of the collector electrodes 10A, 10B. The distribution electrodes 11A, 11B correspond to the carbon layers referred to in the preferred embodiments of the present invention. Further, so-called CARBON NANOBLACK™, for example, may be added in order to enhance conductivity between the activated carbon particles. The activated carbon particles are on the order of about 2 µm in average particle diameter, have microscopic asperities on their surfaces, and are relatively large in their surface areas per unit volume. The distribution electrodes 11A, 11B have a thickness on the order of about 6 µm.

The protective plates 12A, 12B are for protecting the collector electrodes 10A, 10B and the distribution electrodes 11A, 11B, and are composed of polyimide resin, for example. Polyimide resin provides excellent electric isolation and flame resistance, and has a high degree of flexibility. The protective plates 12A, 12B are preferably about 30 µm in thickness.

The partition wall 2 prevents the pair of electrodes 1A, 1B from contacting with and conducting to each other. The partition wall 2 also has the function of allowing the electrolytic solution 3 to pass through it such that the electrolytic solution 3 intervenes between the pair of electrodes 1A, 1B, and is defined by a porous body of polyolefin, for example. The partition wall 2 is of an approximately square of about 5.5 mm per side, and its thickness is preferably on the order of about 15 µm to about 20 µm and is about 20 µm in this preferred embodiment. The material of the partition wall 2 is not limited to a porous body of polyolefin, and may be any other suitable porous insulating material.

The partition wall 2 and the distribution electrodes 11A, 11B are impregnated with the electrolytic solution 3 which intervenes between the pair of electrodes 1A, 1B. As the electrolytic solution 3, for example, an ion liquid such as TEMA (tetraethylmethylammonium) of about 2 mg may be used. Accordingly, with its withstand voltage of about 3V, the electrolytic solution 3 will not deteriorate even if heated to the order of about 300° C. When a voltage is applied to the interfaces between the distribution electrodes 11A, 11B and the electrolytic solution 3, charged ions fixed to the surfaces of the distribution electrodes 11A, 11B and ions within the electrolytic solution 3 in contact with the surfaces of the distribution electrodes 11A, 11B are distributed across the interfaces, thereby forming so-called electric double layers. The distance between positive and negative ions corresponds to the size of one molecule or so in the electric double layers. Thus, electric storage in the electric double layers has the characteristic that the electrostatic capacitance per unit area is relatively large.

The external connecting terminals 5A, 5B are for connecting the electric double layer capacitor A to electronic equipment or the like (not shown), and are defined by substantially rectangular aluminum plates, for example. The high-resistance portions 6A, 6B intervene between the external connecting terminals 5A, 5B and the extending portions 10Aa, 10Ba, respectively.

The high-resistance portions 6A, 6B are smaller in cross-sectional area than the extending portions 10Aa, 10Ba and the external connecting terminal 5A, 5B, and are defined by wires having a diameter of about 50 μm, for example. The high-resistance portions 6A, 6B serve as so-called fuses that melt due to Joule heating when an excessive current flows into the pair of electrodes 1A, 1B from the external connecting terminals 5A, 5B.

The resin package 4 is for protecting the pair of electrodes 1A, 1B. The resin package 4 is composed of epoxy resin, for example, and is about 50 μm in thickness. The resin package 4 also prevents the electrolytic solution 3 from flowing outward or evaporating. A preferred material of the resin package 4 provides excellent insulation and flexibility and, accordingly, may be any material providing these properties. The resin package 4 is formed with a pair of openings 4a. The pair of openings 4a is for exposing the pair of external connecting terminals 5A, 5B.

The electric double layer capacitor A configured as described above has a thickness on the order of about 100 μm in the vertical direction as shown in FIG. 3. In addition, the electric double layer capacitor A has a capacitance of about 100 F.

Further, as shown in FIG. 5, when the electric double layer capacitor A is supported at both ends thereof and provided with a force, the electric double layer A bends due to its overall deflection. In this preferred embodiment, a bending angle θ may be about 15 degrees to about 45 degrees.

Next, a description will be provided as to one example of a manufacturing method of the electrolytic capacitor A.

Figure 7:
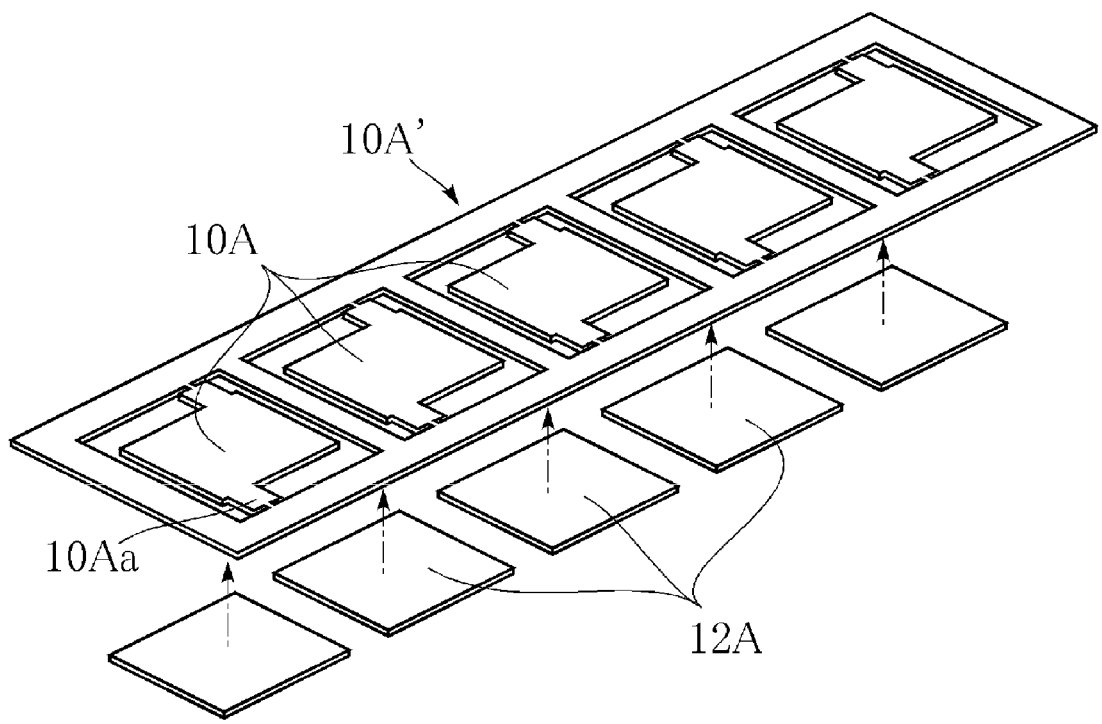
FIG. 7 is a perspective view showing a process of attaching protective plates to an aluminum frame in one example of a manufacturing method of the electric double layer capacitor shown in FIG. 1.

First, as shown in FIG. 7, an aluminum frame 10A' is prepared. The aluminum frame 10A' is a cutout of aluminum foil that is about 20 μm thick. A plurality of collector electrodes 10A are arranged within the aluminum frame 10A'. Protective plates 12A are attached to the aluminum frame 10A' at the lower sides of portions as shown in FIG. 7 which define individual collector electrodes 10A. The protective plates 12A are preferably composed of polyimide resin and have a thickness on the order of about 30 μm, for example.

Figure 8:
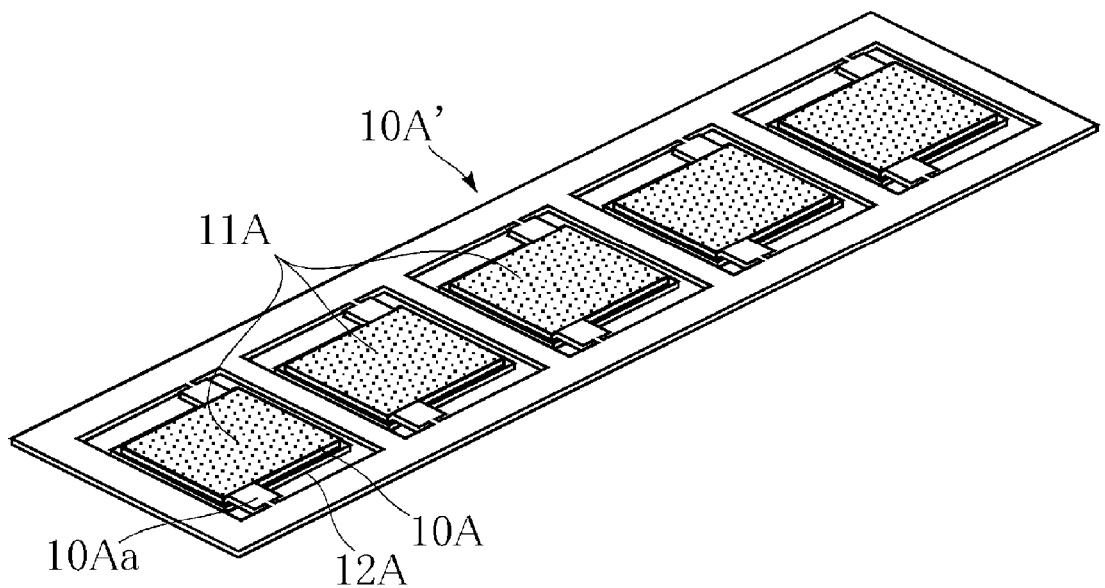
FIG. 8 is a perspective view showing a process of forming collector electrodes in one example of a manufacturing method of the electric double layer capacitor shown in FIG. 1.

Next, as shown in FIG. 8, distribution electrodes 11A are formed. The formation of the distribution electrodes 11A is carried out by applying porous carbon to the aluminum frame 10A' at the upper sides of portions as shown in FIG. 8 which define collector electrodes 10A. The porous carbon in this preferred embodiment is a paste mixed with fine particles of activated carbon of about 2 μm in average particle diameter, for example. The thickness of the application of the porous carbon is preferably about 6 μm.

Figure 9:
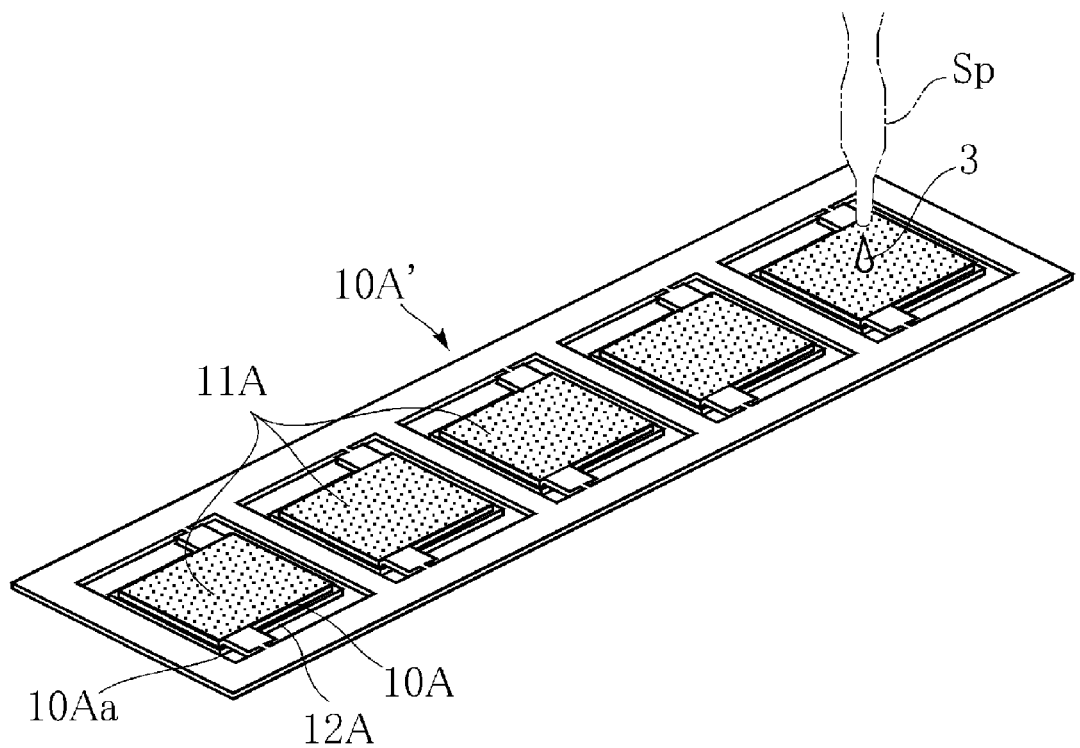
FIG. 9 is a perspective view showing a process of applying an electrolytic solution in one example of a manufacturing method of the electric double layer capacitor shown in FIG. 1.

After the forming of the distribution electrodes 11A, the electrolytic solution 3 is applied as shown in FIG. 9. The application of the electrolytic solution 3 is carried out by dropping an ion liquid such as TEMA of about 2 mg to the distribution electrodes 11A with the use of a dropper Sp, for example.

Figure 10:
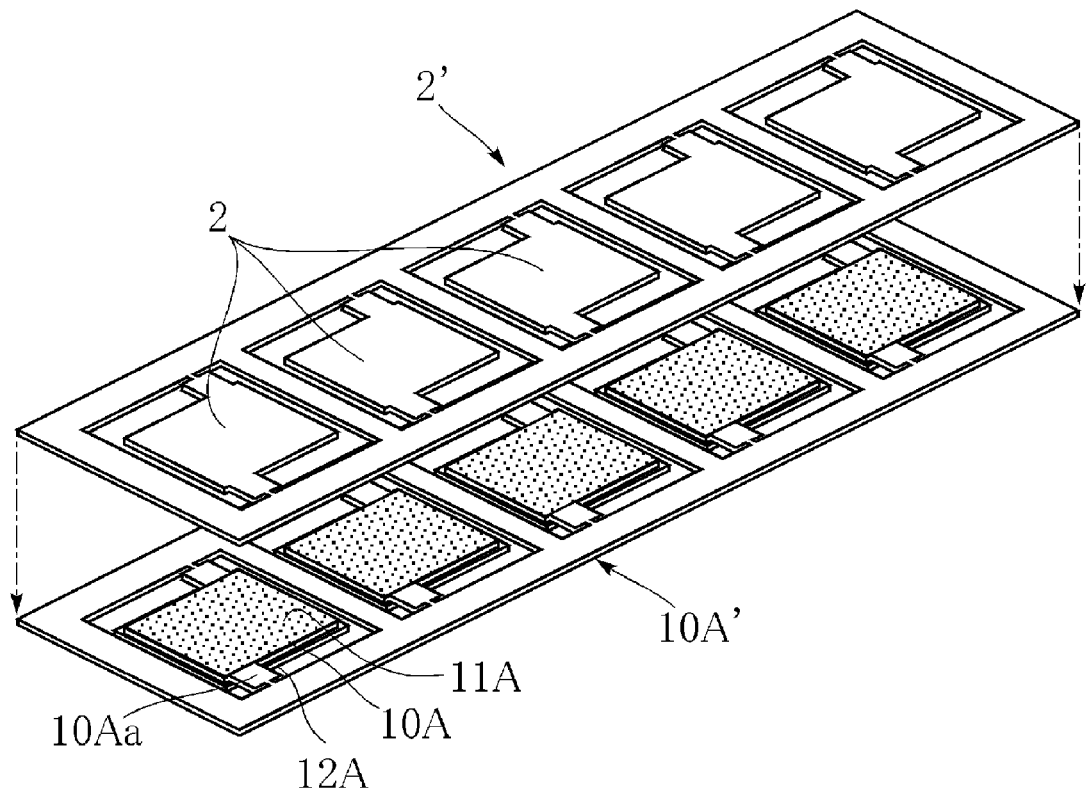
FIG. 10 is a perspective view showing a process of attaching a porous frame in one example of a manufacturing method of the electric double layer capacitor shown in FIG. 1.

Then, as shown in FIG. 10, a porous body frame 2' is attached to the aluminum frame 10A' on which the distribution electrodes 11A are formed. The porous frame 2' is preferably composed of a porous body of polyolefin, for example, and has a thickness on the order of about 20 μm. A plurality of partition walls 2 are formed from the porous frame 2'.

Figure 11:
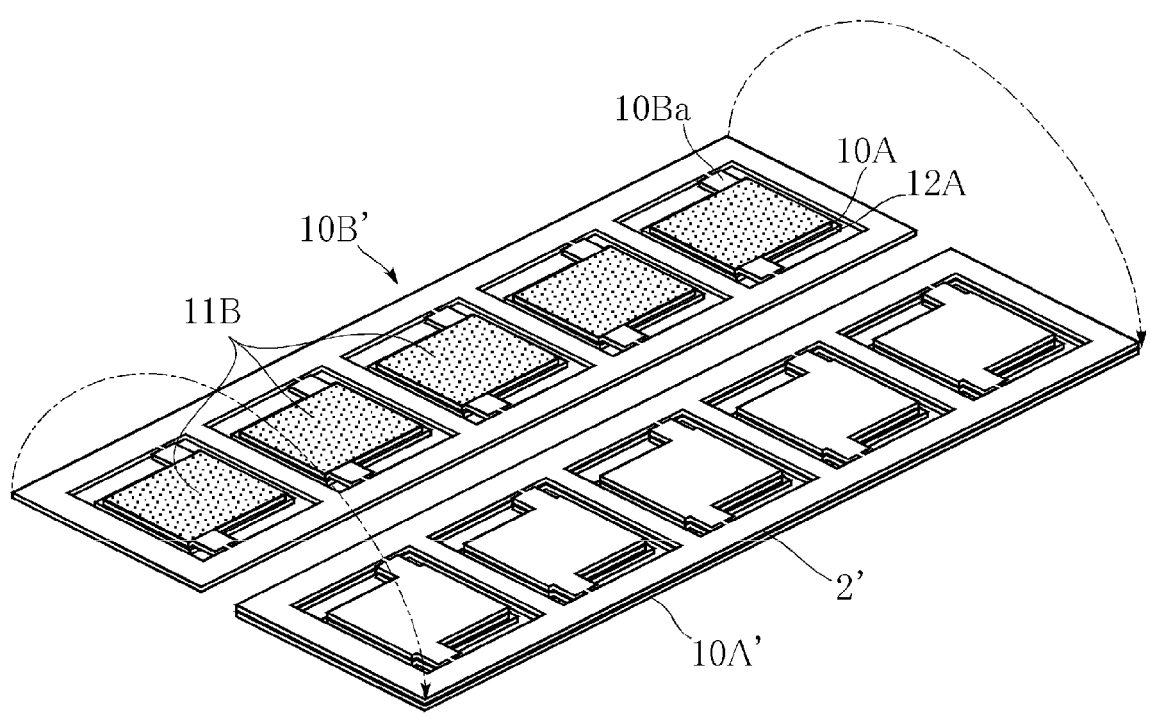
FIG. 11 is a perspective view showing a process of attaching an aluminum frame in one example of a manufacturing method of the electric double layer capacitor shown in FIG. 1.

After attaching the porous frame 2', as shown in FIG. 11, the aluminum frames 10B' are attached to the upper side of the porous frame 2' as further shown in FIG. 11. The aluminum frame 10B' is a frame of aluminum from which a plurality of collector electrodes 10B can be formed. The aluminum frame 10B' has distribution electrodes 11B formed thereon. The formation of the distribution electrodes 11B is the same as that of the distribution electrodes 11A.

Figure 12:
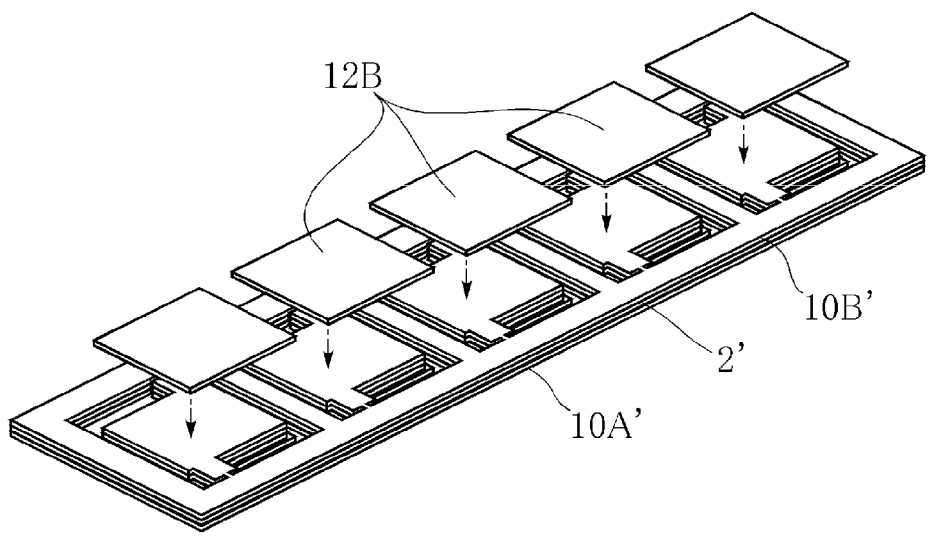
FIG. 12 is a perspective view showing a process of attaching protective plates in one example of a manufacturing method of the electric double layer capacitor shown in FIG. 1.

Then, as shown in FIG. 12, protective plates 12B are attached to the aluminum flame 10B' at the portions which define the collector electrodes 10B. The material and dimensions of the protective plates 12B are the same as those of the protective plates 12A.

After that, pieces of the layered collector electrodes 10A, 10B, distribution electrodes 11A, 11B, partition walls 2, and protective plates 12A, 12B are cut out from the structure in the state shown in FIG. 12. Each of the cut-out pieces is connected with the high-resistance portions 6A, 6B and the external connecting terminals 5A, 5B shown in FIG. 2 to form the resin package 4 shown in FIG. 3. Through the above described process, the electrolytic capacitor A shown in FIG. 1 can be manufactured.

Next, the action of the electrolytic capacitor A will be described.

Figure 6:
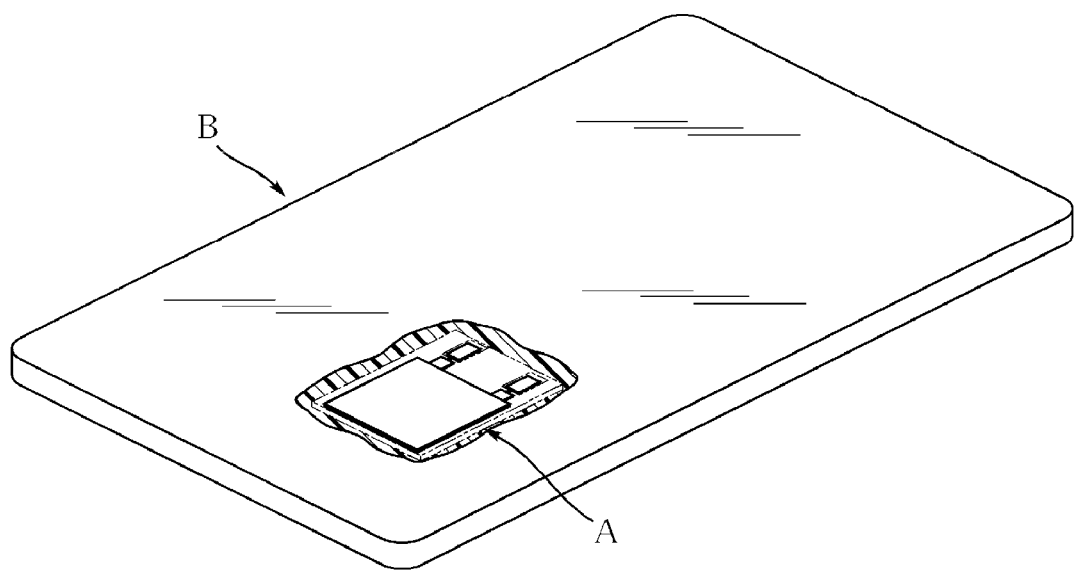
FIG. 6 is an overall perspective view of a partial cross section showing one example of a card-type device using the electric double layer capacitor shown in FIG. 1.

According to this preferred embodiment, the electric double layer capacitor A can be made thinner. In particular, a thickness of about 6 μm of the distribution electrodes 11A, 11B as carbon layers would be advantageous in order to provide a finished electric double layer capacitor A having a thickness of about 100 μm. This thickness reduction allows the electric double layer capacitor A to be installed in a card-type device B as shown in FIG. 6, for example. The card-type device B is equipped with electronic components such as infrared-emitting devices, for example, and has a thickness of about 1 mm. The electric double layer capacitor A is as thin as about 100 μm, and thus is suitable for use in supporting power supply to the electronic components in the card-type device B.

Further, the electric double layer capacitor A has a flat shape about 100 μm thick and about 5 mm wide. It offers a high degree of flexibility with which it can be bent with its ends supported at an angle of about 15 degrees to about 45 degrees. Accordingly, when the electric double layer capacitor A is installed in the card-type device B, if the card-type device B itself has a compliant structure that can be freely bent by a user, the electric double layer capacitor A has the ability to follow the bends.

The thinner the distribution electrodes 11A, 11B are, the less the resistance of the electric double layer capacitor A can be achieved (reduced ESR). In this preferred embodiment, the distribution electrodes 11A, 11B with a thickness of about 6 μm allows the ESR of the electric double layer capacitor A to be about 1 mΩ or lower.

The provision of the electrolytic solution 3 composed of an ion liquid achieves a withstand voltage of about 3V. This is because, if the electric double layer capacitor A is to be used in a power supply application, for example, the limitation for the operating voltage of the electronic equipment to be supplied with power is relaxed. Moreover, in addition to the case with this preferred embodiment, if an organic electrolyte such as PC (propylene carbonate) is used as the electrolytic solution 3, the withstand voltage can be about 2V. Further, if a water solution such as sulfuric acid is used as the electrolytic solution 3, the withstand voltage can be about 1.2V.

Reducing the ESR and raising the withstand voltage result in an improvement in power density. The power density is expressed as $V^2/4R$ and is an indicator meaning that the higher the value, the more quickly power can be supplied. Here, V is withstand voltage and R is ESR. According to this preferred embodiment, both a raised withstand voltage and reduced ESR are possible as stated above, which is suitable for increasing power density. The electric double layer capacitor A is provided for support of power supply to electronic components which operate at a high power in a short period of time.

The electric double layer capacitor A can operate properly even at relatively high temperatures on the order of about 300° C. Therefore, it can be installed in electronic equipment used in environments at high ambient temperatures. Further, there is a low possibility that the electric double layer capacitor A is damaged or broken even if it generates internal heat during its use.

The high-resistance portions 6A, 6B serve as so-called fuses, which make it possible to prevent an excessive current from flowing into the pair of electrodes 1A, 1B, thereby avoiding damaging or breaking of the electric double layer capacitor A. Further, the high-resistance portions 6A, 6B also act as fuses even if electric energy accumulated in the electric double layer capacitor A has been discharged to the outside due to the occurrence of a short-current. This properly avoids damage to the electronic equipment having the electric double layer capacitor.

Figure 13:
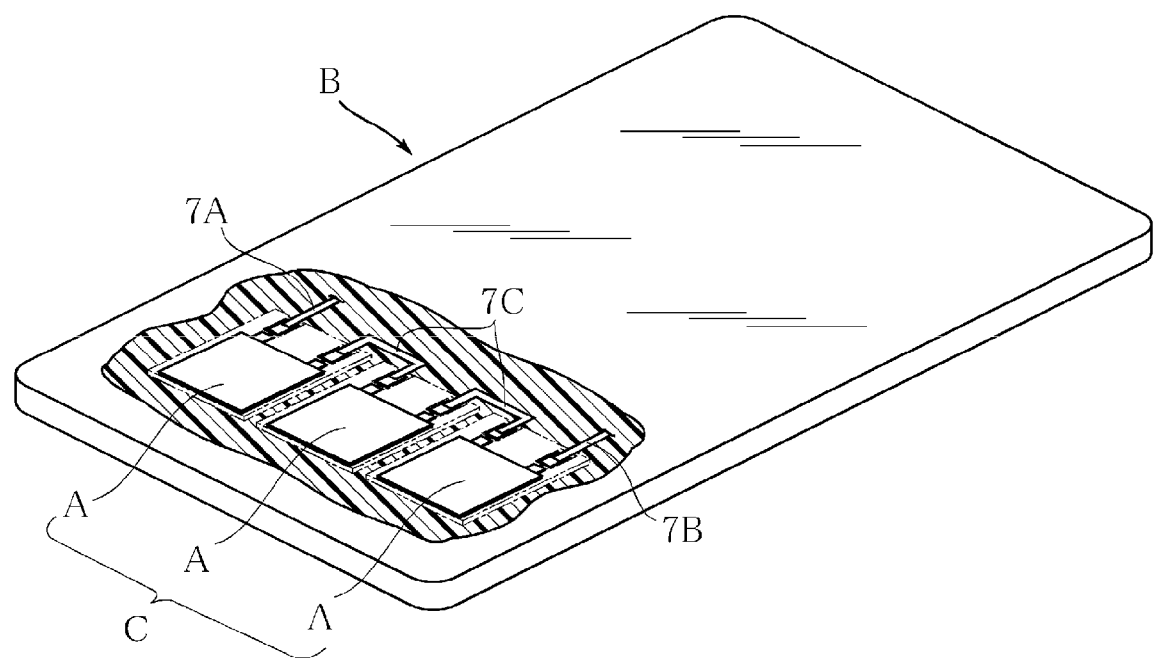
FIG. 13 is a perspective view of a partial cross section showing one example of an electric double layer capacitor according to a preferred embodiment of the present invention.

FIG. 13 shows one example of an aggregation of electric double layer capacitors according to a preferred embodiment of the present invention. An aggregation C of this preferred embodiment includes three electric double layer capacitors A and wires 7A, 7B and 7C, and is installed in the card-type device B.

The electric double layer capacitor A is identical to the above-described electric double layer capacitor A. The wire 7A is connected to a positive electrode in the electric circuit of the card-type device B. The wire 7B is connected to the negative electrode in the electric circuit of the card-type device B. The wire 7C connects the external connecting terminals 5A, 5B of the adjacent electric double layer capacitors A. Consequently, the three electric double layer capacitors A are connected to one another in series through the wires 7A, 7B and 7C.

According to this preferred embodiment, it is easy to increase a withstand voltage of the aggregation C. Therefore, in the card-type device B, appropriate power supply can be carried out to the electronic components requiring higher-voltage power.

Figure 14:
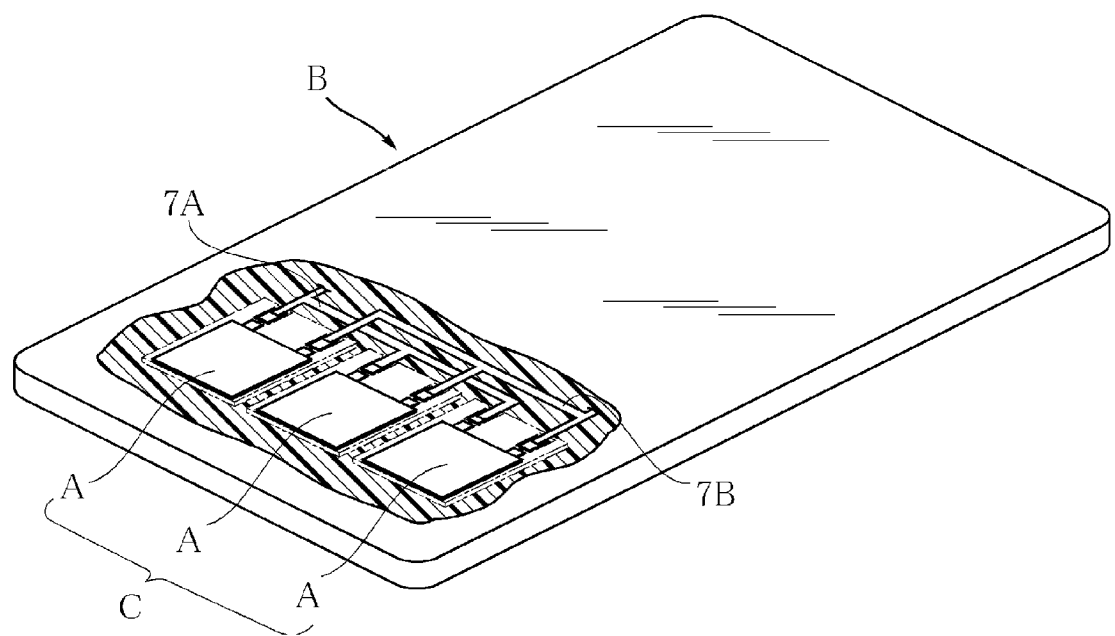
FIG. 14 is a perspective view of a partial cross section showing another example of an electric double layer capacitor according to a preferred embodiment of the present invention.
Figure 15:
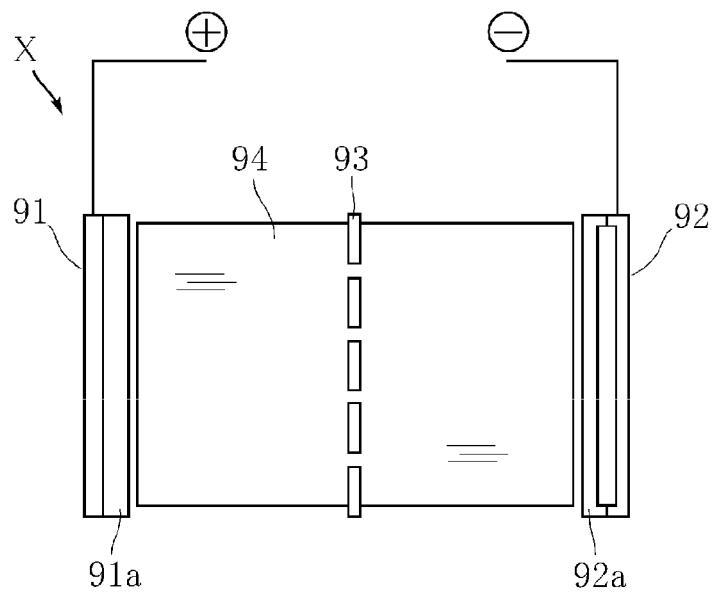
FIG. 15 is a cross-sectional view showing one example of a conventional electric double layer capacitor.

FIG. 14 shows another example of an aggregation of electric double layer capacitors according to a preferred embodiment of the present invention. An aggregation C of this preferred embodiment includes three electric double layer capacitors A and wires 7A, 7B. In this preferred embodiment, the wire 7A connects external connecting terminals 5A of the three electric double layer capacitors A to one another. The wire 7B connects external connecting terminals 5B of the three electric double layer capacitors A to one another. With this, the three electric double layer capacitors A are connected in parallel to one another.

According to this preferred embodiment, it is easy to increase the electrostatic capacitance of the aggregation C. Therefore, in the card-type device B, appropriate power supply can be carried out to the electronic components requiring larger-current power.

An electric double layer capacitor and an aggregation of electrical double layer capacitors according to the present invention are not limited to the above described preferred embodiments. Specific configurations of an electric double layer capacitor and individual portions of an aggregation of electric double layer capacitors can be changed in design in a variety of manners.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electric double layer capacitor comprising:
   a pair of electrodes each including a carbon layer and arranged opposite to each other;
   a partition wall separating the pair of electrodes from each other;
   a pair of external electrodes each conductively connected to the pair of electrodes; and
   an electrolytic solution provided between the pair of electrodes; wherein
   the carbon layer is about 6 μm or less in thickness; and
   a high-resistance portion is arranged between at least one of the pair of electrodes and the external electrodes conductive thereto and is smaller in cross-sectional area than the at least one electrode and the external electrodes.

2. The electric double layer capacitor according to claim 1, wherein a thickness in a direction in which the pair of electrodes and the partition wall are layered is about 1,000 μm or less.

3. The electric double layer capacitor according to claim 1, wherein a withstand voltage of the electric double layer capacitor is about 1.2V or more.

4. The electric double layer capacitor according to claim 1, wherein an operating temperature limit of the electric double layer capacitor is about 100° C. or more.

5. The electric double layer capacitor according to claim 1, wherein the high-resistance portion includes wires.

6. An aggregation of electric double layer capacitors, comprising a plurality of electric double layer capacitors according to claim 1.

7. The aggregation of electric double layer capacitors according to claim 6, wherein the plurality of electric double layer capacitors are connected to one another in series.

8. The aggregation of electric double layer capacitors according to claim 6, wherein the plurality of electric double layer capacitors are connected to one another in parallel.

9. An electric double layer capacitor comprising:
   a pair of electrodes each including a carbon layer and arranged opposite to each other;
   a partition wall separating the pair of electrodes from each other;
   a pair of external electrodes each conductively connected to the pair of electrodes; and
   an electrolytic solution provided between the pair of electrodes; wherein a thickness of the electric double layer capacitor in a direction in which the pair of electrodes and the partition wall are layered is about 1/50 or less of a width thereof in a direction that is substantially perpendicular to the direction of the layering; and a high-resistance portion is arranged between at least one of the pair of electrodes and the external electrodes conductive thereto and is smaller in cross-sectional area than the at least one electrode and the external electrodes.

10. The electric double layer capacitor according to claim 9, wherein a withstand voltage of the electric double layer capacitor is about 1.2V or more.

11. The electric double layer capacitor according to claim 9, wherein an operating temperature limit of the electric double layer capacitor is about 100° C. or more.

12. The electric double layer capacitor according to claim 9, wherein the high-resistance portion includes wires.

13. An aggregation of electric double layer capacitors, comprising a plurality of electric double layer capacitors according to claim 9.

14. The aggregation of electric double layer capacitors according to claim 13, wherein the plurality of electric double layer capacitors are connected to one another in series.

15. The aggregation of electric double layer capacitors according to claim 13, wherein the plurality of electric double layer capacitors are connected to one another in parallel.

16. An electric double layer capacitor comprising:
a pair of electrodes each including a carbon layer and arranged opposite to each other;
a partition wall separating the pair of electrodes from each other;
a pair of external electrodes each conductively connected to the pair of electrodes; and
an electrolytic solution provided between the pair of electrodes; wherein
the electric double layer capacitor is flexible and can bend at an angle of from about 15 degrees to about 45 degrees; and
a high-resistance portion is arranged between at least one of the pair of electrodes and the external electrodes conductive thereto and is smaller in cross-sectional area than the at least one electrode and the external electrodes.

17. The electric double layer capacitor according to claim 16, wherein a withstand voltage of the electric double layer capacitor is about 1.2V or more.

18. The electric double layer capacitor according to claim 16, wherein an operating temperature limit of the electric double layer capacitor is about 100° C. or more.

19. The electric double layer capacitor according to claim 16, wherein the high-resistance portion includes wires.

20. An aggregation of electric double layer capacitors, comprising a plurality of electric double layer capacitors according to claim 16.

21. The aggregation of electric double layer capacitors according to claim 20, wherein the plurality of electric double layer capacitors are connected to one another in series.

22. The aggregation of electric double layer capacitors according to claim 20, wherein the plurality of electric double layer capacitors are connected to one another in parallel.

* * * * *